United States Patent [19]
Shea et al.

[11] 3,800,147
[45] Mar. 26, 1974

[54] TURBIDIMETER WITH FORMED FLOW CHAMBER

[75] Inventors: James J. Shea, Dearborn Heights; Samuel S. Ochodnicky, Detroit, both of Mich.

[73] Assignee: Gam Rad, Inc., Detroit, Mich.

[22] Filed: Jan. 22, 1969

[21] Appl. No.: 792,941

[52] U.S. Cl. .............. 250/564, 250/238, 250/205, 356/208
[51] Int. Cl. .......................................... G01n 21/26
[58] Field of Search .......... 250/218, 205, 43.5, 238, 250/239; 356/103, 208, 104, 207

[56] References Cited
UNITED STATES PATENTS

| | | | |
|---|---|---|---|
| 2,875,666 | 3/1959 | Parker et al. | 250/218 |
| 2,995,978 | 8/1961 | Glandon et al. | 250/205 |
| 3,084,252 | 4/1963 | Goupil et al. | 250/43.5 |
| 3,412,570 | 11/1968 | Pruett | 250/218 |
| 1,994,768 | 3/1935 | Holven et al. | 356/103 |
| 3,234,846 | 2/1966 | Cropper et al. | 356/208 |
| 3,450,886 | 6/1969 | Lown | 250/218 |

*Primary Examiner*—Walter Stolwein
*Attorney, Agent, or Firm*—Joseph R. Papp

[57] ABSTRACT

A turbidimeter utilizing a low cost flow chamber made from tubing and including a necked down portion having a plurality of flat sides for facilitating mounting of various sensing components and including a novel consturction for automatically compensating for color in low turbidity applications.

4 Claims, 6 Drawing Figures

PATENTED MAR 26 1974
3,800,147
SHEET 1 OF 2
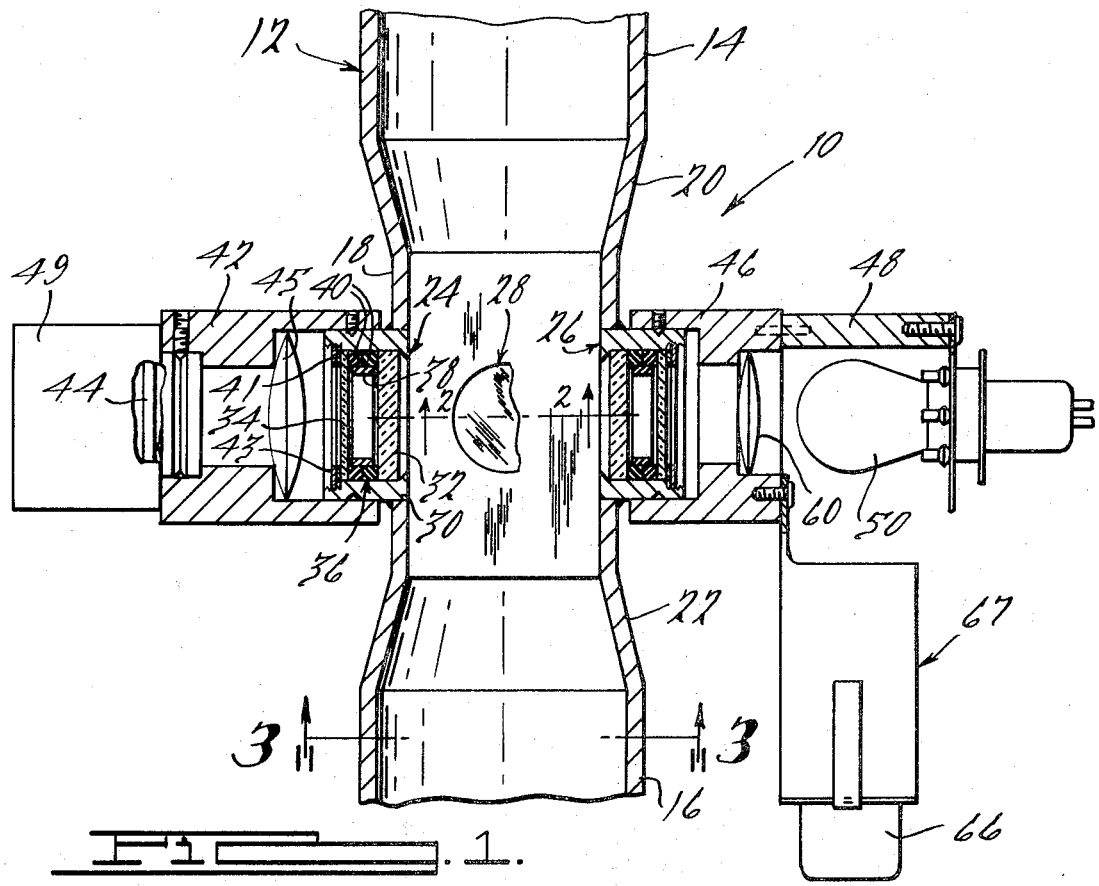
FIG. 1.
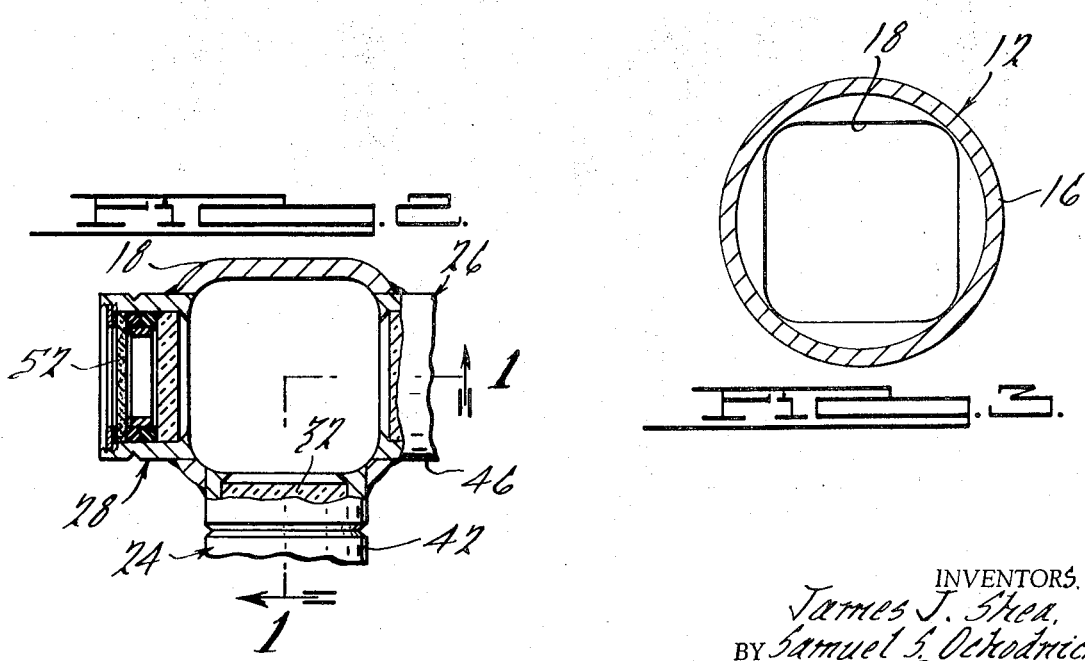
FIG. 2.
FIG. 3.
INVENTORS.
James J. Shea,
BY Samuel S. Ochodnicky.
Harness, Dickey & Pierce
ATTORNEYS.

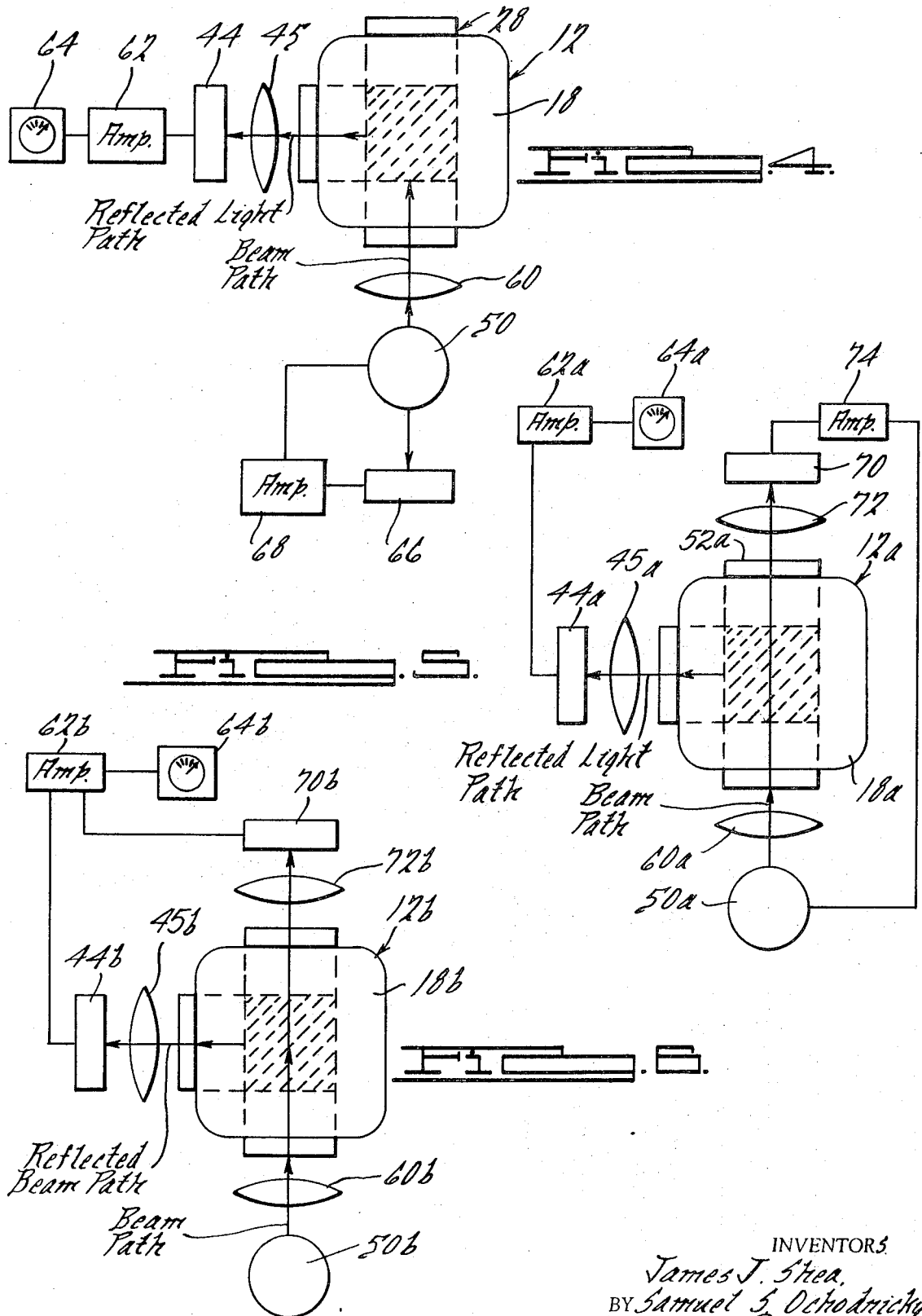

TURBIDIMETER WITH FORMED FLOW CHAMBER

SUMMARY BACKGROUND OF THE INVENTION

The present invention relates to turbidimeters and more particularly to a turbidimeter having a novel flow chamber and including novel color compensating apparatus.

In prior turbidimeter constructions, it has been conventional to provide a flow chamber made of a heavy cast material with a generally uniform cross section throughout its length. In the present invention a flow chamber has been provided which is of a low cost construction by utilizing relatively thin gauge tubing material. Therefore, it is an object of the present invention to provide a novel turbidimeter having a low cost flow chamber made of tube stock.

In the present invention the apparatus can be utilized for sensing low turbidity concentrations in fluids which can vary in color; since different colors have different absorptive effects on light, it is necessary that some modification be made in order that the same meter provide an accurate reading of turbidity independent of variations in color of the fluid being sampled. In the present invention color compensation apparatus is provided whereby the necessary modifications are automatically made; therefore, it is another object of the present invention to provide a turbidimeter having automatic color compensation.

It is another object of the present invention to provide a novel turbidimeter.

Other objects, features, and advantages of the present invention will become apparent from the subsequent description and the appended claims, taken in conjunction with the accompanying drawings, in which:

BRIEF DESCRIPTION OF THE DRAWING

FIG. 1 is an elevational view with some parts shown in section, other parts shown broken away of a turbidimeter embodying features of the present invention with the section generally taken along the lines 1—1 in FIG. 2;

FIG. 2 is a sectional view of the apparatus of FIG. 1, taken generally along the lines 2—2;

FIG. 3 is a sectional view of the apparatus of FIG. 1 taken generally along the lines 3—3 in FIG. 1;

FIG. 4 is a schematic block diagram generally depicting the various operational members of the turbidimeter of FIG. 1;

FIG. 5 is a diagram similar to FIG. 4 but including modifications for color compensation; and FIG. 6 is a view similar to FIG. 5 depicting different color compensating apparatus.

Looking now to FIG. 1, the turbidimeter assembly is generally indicated by the numeral 10 and includes a tubular flow chamber 12. The flow chamber 12 is constructed from tube stock and is of a generally thin wall construction and has identical outer portions 14 and 16 located at opposite ends which are of a generally circular cross section (see FIG. 3). The center portion 18 of the flow chamber 12 is provided with a plurality of flats and is generally rectangular in cross section (see FIG. 2). Transition areas 20 and 22 provide for smooth blending from the circular cross sections 14 and 16, respectively to the rectangular cross section 18.

The flow chamber 12 can be readily formed from tube stock having a circular cross section into the shape as shown in the drawings by merely deforming the center and transition portions, i.e., 18, 20 and 22, radially inwardly. As noted, the transition portions 20 and 22 provide a smooth transition between sections whereby good fluid flow characteristics are maintained.

A plurality of adapter assemblies 24, 26 and 28 are secured in openings through the flat walls of portion 18 as by brazing or welding. Since the adapter assemblies 24, 26 and 28 are similar, only the details of assembly 24 will be described. Assembly 24 includes an annular body member 30, of circular section which has an inner window 32 located in its inner end and an outer window 34 at its outer end; the windows 32 and 34 are held apart by a spacer assembly 36 which includes a tubular spacer ring 38 and a pair of O-ring seals 40. A gasket 41 is located adjacent window 34 and the assembly of windows 34 and 32, spacer assembly 36 and gasket 41 are all held together by a lock nut 43. A generally annular housing 42 is seucred to the body member 24 and supports a photoresistive element 44 located in a heater assembly 49 secured at its rearward end; the cell 44 receives light transmitted through the assembly 24 and through the adapter 42. The light transmitted is focused by a lens 45.

The adapter assembly 26 (similar to assembly 24) is located on one of the flats substantially at 90° to the assembly 24; an annular housing 46 (similar to housing 42) is secured to the assembly 26. The housing 46, has a collimating lens 60. A light assembly 48, including a lamp 50, is secured to housing 46 and will transmit light into the portion 18 of the flow chamber 12. The meter 10 is constructed to operate on the Tyndall effect and hence the sensor 44 is located to receive light reflected at 90° from the particles in the fluid.

The adapter assembly 28 is located on a flat directly opposite the assembly 26 and is similar to assemblies 24 and 26 except that it is provided with a generally opaque window 52, instead of the transparent window 40. The assembly 28 acts as a light trap and tends to minimize unwanted reflected light from the walls of portion 18. The heater assembly 49 in which the photo element 44 is held maintains the cell 44 at a relatively constant temperature and hence eliminates variations in output due to ambient temperature changes. In addition another photo cell 66 is located in an assembly 67, located relative to the lamp 50; variations in light intensity are detected and the voltage to lamp 50 is automatically varied to maintain the intensity constant.

A generally schematic block diagram of the apparatus of FIG. 1 is shown in FIG. 4. Thus the lamp 50 transmits light through collimating lens 60 into the interior of the flow chamber 12. Light reflected at right angles as a result of Tyndall effect will be transmitted through the assembly 24 through focusing lens 45 to photoresistive cell 44. The photo cell 44 is connected to an amplifier section 62 which in turn is connected to an output indicator 64 such that changes in resistance in the photo cell 44 as caused by variations in the intensity of the reflected light, i.e., Tyndall effect, will result in variations in the indications at the indicator 64. These indications can be calibrated to provide an indication of the amount or degree of turbidity in the fluid being transmitted through the chamber 12.

Note that with the construction of the flow chamber 12 as shown, a relatively large cross sectional area can be provided at the entrance and exit areas 14 and 16 and a reduced cross section of limited extent provided only at the sensing area 18. Hence, the resistance to flow as a result of the reduced section at 18 is maintained at a minimum. However, at the same time, by reducing the section the distance between the light source 50 and the photo cell 44 is minimized such that the length of light path is minimized whereby a higher output can result. The monitor photo cell 66 monitors the output from the light source 50 an is connected to an amplifier 68 which varies the voltage to the light 50 such that loss of light intensity from lamp 50, as a result of aging, will be automatically compensated to maintain the output from light 50 generally constant.

In some applications it is necessary to provide turbidity indications of fluids which may vary in color; since various colors absorb light to differing degrees, it is desirable in these applications, to have some means to automatically compensate for variations in color. This is provided by the apparatus shown in FIG. 5.

In the apparatus shown in FIG. 5 elements similar to that shown and described in FIGS. 1 through 4 have been given the same numeral designation with the addition of a letter postscript $a$. Thus, the lamp 50$a$ transmits light through collimating lense 60$a$. The collimated light is transmitted to the flow chamber 12$a$ and reflected light by Tyndall effect will be received by a photosensitive cell 44$a$ through a focusing lens 45$a$. The assembly 28 of FIGS. 1–4 is modified and in FIG. 5 is provided with a transparent window 52$a$ in place of the opaque window 52 and further is provided with a photoresistive cell 70, which is supported in a housing (not shown) similar to housings 42 and 46. The cell 70 is located directly across from the lamp 50$a$ and hence receives the light which is transmitted directly through the flow chamber 12$a$ which light is focused by lense 72. The photoresistive cell 70 will vary in resistance in accordance with light transmitted through the flow chamber 12$a$. These variations in resistance will be an indication of the amount of absorption of the light from the source 50$a$ and hence will provide an indication of the absorption as a result of variations in color of the fluid flowing through the chamber 12$a$. The output from the photoresistive member 70 is fed to an amplifier 74 which is connected to control the potential to the light source 50$a$ whereby its intensity will be varied to maintain the amount of transmitted light and hence output at the photo cell 70 substantially constant. In this way, light absorption as a result of variations in color will be automatically compensated. The output from the photo cell 44$a$ is fed to the amplifier 62$a$ which in turn is connected to indicator 64$a$ to provide an indication of turbidity which is independent of variations in the color of the fluid being analyzed. Note that with the apparatus as shown in FIG. 5, effects of aging of the light source 50$a$ will also automatically be compensated since the photo cell 70 will tend to maintain the light intensity transmitted through the flow chamber 12$a$ constant.

It is also possible to provide color compensation by varying the output from the amplifier 62$a$ in accordance with the signal from the photo cell 70. FIG. 6 depicts a circuit variation. In FIG. 6 apparatus similar to that shown in FIGS. 1 through 4 and FIG. 5 are given the same numerical designation with the addition of a letter postscript $b$. Thus, the amplifier 62$b$ receives information from the photo cell 70$b$ as well as from the output cell 44$b$; the gain of the amplifier 62$b$ is varied in accordance with the variations in intensity of the light transmitted through flow chamber 12$b$ and as received by the photo cell 70$b$. In this way, the output from amplifier 62$b$ will automatically compensate for variations in color of the fluid being analyzed. The apparatus shown in FIGS. 5 and 6 is to be used for fluids having low turbidities, i.e., less than around 100 p.p.m. In these applications the amount of light absorption due to turbidity is extremely low and hence variations in turbidity will provide substantially no variation in the output of the cells 70 or 70$b$ and these cells will respond substantially solely to variations in absorption due to color changes.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A turbidimeter including a flow chamber assembly, said flow chamber assembly comprising a tubular member constructed from non-cast tube stock, said tubular member having tubular inlet and outlet portions of a first selected cross-section, a viewing portion located intermediate said inlet and outlet portions and including a plurality of flat sides defining a rectangle and having a second selected cross-section substantially less than said first cross-section, said tubular member having transition portions located between said inlet and outlet portions and said viewing portion and each having a varying cross-section smoothly blending said second cross-section with said first cross-section, said inlet, outlet, viewing, and transition portions being integrally formed from said non-cast tube stock, whereby the path length for light transmitted into said viewing portion is minimized thereby providing an increased intensity of a light signal representative of turbidity, a light source located at one of said flat sides and a first photocell located at an adjacent different one of said flat sides to provide an output as the result of Tyndall effect, output means for providing an output indication of the degree of turbidity in response to the output of said first photocell, a second photocell located at another one of said flat sides opposite said light source to provide an output varying with absorption of light transmitted as a result of variation in color of the fluid being analyzed and compensating means responsive to the output of said second photocell for automatically compensating for variations in absorption due to variations in color whereby the output resultant from said first photocell will be an indication of turbidity substantially unaffected by variations in color.

2. The turbidimeter of claim 1 for use in applications with fluids having a turbidity of less than around 100 p.p.m.

3. The turbidimeter of claim 2 with said compensating means connected to said light source for varying the intensity of said light source to compensate for variations in light absorption due to variations in the color of the fluid.

4. The turbidimeter of claim 2 with said compensating means being connected to the output means for said first photocell for varying the output of said output means to compensate for variations in light absorption due to variations in the color of the fluid.

* * * * *